(12) United States Patent
Sze et al.

(10) Patent No.: US 7,244,203 B2
(45) Date of Patent: Jul. 17, 2007

(54) BICYCLE DERAILLEUR

(75) Inventors: Raymond Tan Boon Sze, Bedok New Town (SG); Jimmy Sua Gin Hoe, Jurong East New Town (SG)

(73) Assignee: Shimano (Singapore) Pte., Ltd., Jurong Town (SG)

( * ) Notice: Subject to any disclaimer, the term of this patent is extended or adjusted under 35 U.S.C. 154(b) by 612 days.

(21) Appl. No.: 10/786,227

(22) Filed: Feb. 26, 2004

(65) Prior Publication Data

US 2005/0192138 A1 Sep. 1, 2005

(51) Int. Cl.
*F16H 63/00* (2006.01)
*B62M 9/12* (2006.01)
*B62J 15/02* (2006.01)

(52) U.S. Cl. .................. 474/82; 474/160; 474/152; 474/144

(58) Field of Classification Search ............ 474/78–83, 474/160, 162, 133–135, 144; 74/606 K
See application file for complete search history.

(56) References Cited

U.S. PATENT DOCUMENTS

| | | | |
|---|---|---|---|
| 3,910,136 A | | 10/1975 | Shimano |
| 4,410,313 A | * | 10/1983 | Shimano ................ 474/82 |
| 4,575,365 A | * | 3/1986 | Nagano ................ 474/80 |
| 5,711,731 A | * | 1/1998 | Fukuda ................ 474/79 |

FOREIGN PATENT DOCUMENTS

| | | | | |
|---|---|---|---|---|
| EP | 0461053 A1 | * | 12/1991 | .............. 474/80 |
| FR | 923.764 | | 7/1947 | |
| FR | 2637249 A1 | * | 9/1988 | |
| FR | 2 651 474 B1 | | 12/1991 | |
| JP | 60-188086 | | 12/1985 | |
| JP | 60-188087 | | 12/1985 | |
| JP | 60-195287 | | 12/1985 | |
| JP | 61-17393 | | 1/1986 | |

* cited by examiner

*Primary Examiner*—Marcus Charles
(74) *Attorney, Agent, or Firm*—Global IP Counselors, LLP (57) ABSTRACT

A bicycle derailleur is provided with a chain guide that basically includes inner and outer guide plates, a guide pulley and a tension pulley. The tension pulley is rotatable about a rotation axis between free ends of the guide plates. The tension pulley has an annular recess disposed about the rotation axis to form a projection. The inner guide plate has a guide section with a radially outermost edge. Preferably, the outermost edge of the guide section is located in the annular recess, and the projection projects axially further from a center plane of the tension pulley than the outermost edge. Preferably, the chain guide includes a dust cap coupled between the inner guide plate and the tension pulley. Preferably, the outermost edge of the guide section is located radially inwardly of the projection and radially outwardly of the annular portion of the dust cap.

28 Claims, 11 Drawing Sheets

BICYCLE DERAILLEUR

BACKGROUND OF THE INVENTION

1. Field of the Invention

This invention generally relates to a bicycle derailleur. More specifically, the present invention relates to a rear bicycle derailleur having an inner plate and tension pulley configured to prevent jamming of the derailleur when pushed into a moving bicycle wheel.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle derailleur.

Typically, a bicycle derailleur has a base member and a chain guide movably coupled to the base member via a linkage assembly. The base member is coupled to the frame of the bicycle. The chain guide is configured to move the chain laterally over a plurality of rear sprockets. A spring typically biases the chain guide to an innermost or outermost position relative to the sprockets. A Bowden-type control cable with an outer sheath and an inner wire is typically coupled to the derailleur and to a conventional shift control device.

The chain guide of a front derailleur includes a pair of shift plates arranged to move the chain laterally back and forth. The front derailleur is usually coupled to the seat tube of the frame. On the other, the rear derailleur is coupled to the rear triangle of the bicycle frame adjacent the rear wheel. The chain guide of the rear derailleur usually includes a pair of guide plates with a guide pulley and a tension pulley mounted between the guide plates. The chain is wrapped around both pulleys in an S-shaped manner between the guide plates in order to efficiently guide the chain to the appropriate sprocket during shifting and in order to appropriately tension the chain.

Due to the configuration of typical rear derailleurs, obstructions such as brush, debris, rocks, branches or the like sometimes contact them and cause the chain guide to move toward the rear wheel. If a sufficient force is applied to the rear derailleur, the inner chain guide plate and/or the tension pulley can be pushed into the rear wheel. In particular, if a sufficient force is applied to the chain guide by an obstruction, the inner chain guide plate and/or the tension pulley can contact the spokes of the rear wheel. Such contact can jam the rear wheel and/or the rear derailleur, resulting in decreased riding/shifting performance.

In view of the above, it will be apparent to those skilled in the art from this disclosure that there exists a need for an improved bicycle derailleur. This invention addresses this need in the art as well as other needs, which will become apparent to those skilled in the art from this disclosure.

SUMMARY OF THE INVENTION

One object of the present invention is to provide a bicycle derailleur, which reduces potential jams when objects contact the derailleur to push the chain guide of the derailleur into the wheel.

Another object of the present invention is to provide a bicycle derailleur that smoothly and reliably shifts the chain over the various sprockets.

Another object of the present invention is to provide a bicycle derailleur that is relatively simple and inexpensive to manufacture and assemble.

Still another object of the present invention is to provide a bicycle derailleur that is strong, yet relatively lightweight.

The foregoing objects can basically be attained by providing a bicycle derailleur that comprises a shiftable portion configured and arranged to move between a top position and a low position and a chain guide coupled to the shiftable portion to be laterally moved by the shiftable portion. The chain guide includes an inner guide plate, an outer guide plate, a guide pulley and a tension pulley. The inner guide plate has an inner attachment end and an inner free end. The outer guide plate has an outer attachment end and an outer free end that are arranged to form a chain receiving slot between the inner and outer guide plates. The guide pulley is rotatably coupled between the inner and outer attachment ends of the inner and outer guide plates. The tension pulley is rotatably coupled about a rotation axis between the inner and outer free ends of the inner and outer guide plates. The tension pulley has an annular recess disposed about the rotation axis of the tension pulley to form a projection. The inner guide plate has a guide section with a radially outermost edge of the guide section located in the annular recess. The projection projects in an axial direction further from a center plane of the tension pulley than the outermost edge of the guide section.

The foregoing objects can also basically be attained by providing a bicycle derailleur that comprises a shiftable portion configured and arranged to move between a top position and a low position and a chain guide coupled to the shiftable portion to be laterally moved by the shiftable portion. The chain guide includes an inner guide plate, an outer guide plate, a guide pulley, a tension pulley and a dust cap. The inner guide plate has an inner attachment end and an inner free end. The outer guide plate has an outer attachment end and an outer free end that are arranged to form a chain receiving slot between the inner and outer guide plates. The guide pulley is rotatably coupled between the inner and outer attachment ends of the inner and outer guide plates. The tension pulley is rotatably coupled about a rotation axis X between the inner and outer free ends of the inner and outer guide plates. The tension pulley has an annular recess disposed about the rotation axis X of the tension pulley to form a projection that projects in an axial direction from a center plane of the tension pulley. The dust cap is coupled between the inner guide plate and the tension pulley. The dust cap has a mounting portion and an annular portion extending from the mounting portion into the recess about the rotation axis X. The inner guide plate has a guide section with a radially outermost edge of the guide section located radially inwardly of the projection and radially outwardly of the annular portion of the dust cap.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions and illustrations of the selected embodiments of the present invention are provided for illustration only and not for the purpose of limiting the invention as defined by the appended claims and their equivalents.

Figure 1:
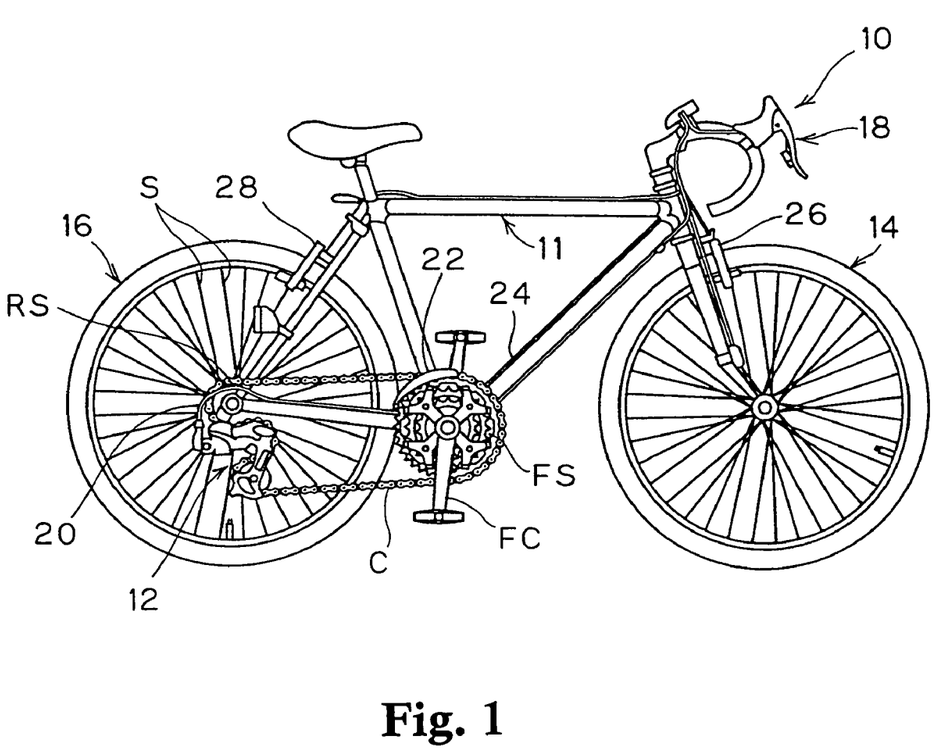
FIG. 1 is a side elevational view of a bicycle with a rear derailleur in accordance with a preferred embodiment of the present invention.
Figure 2:
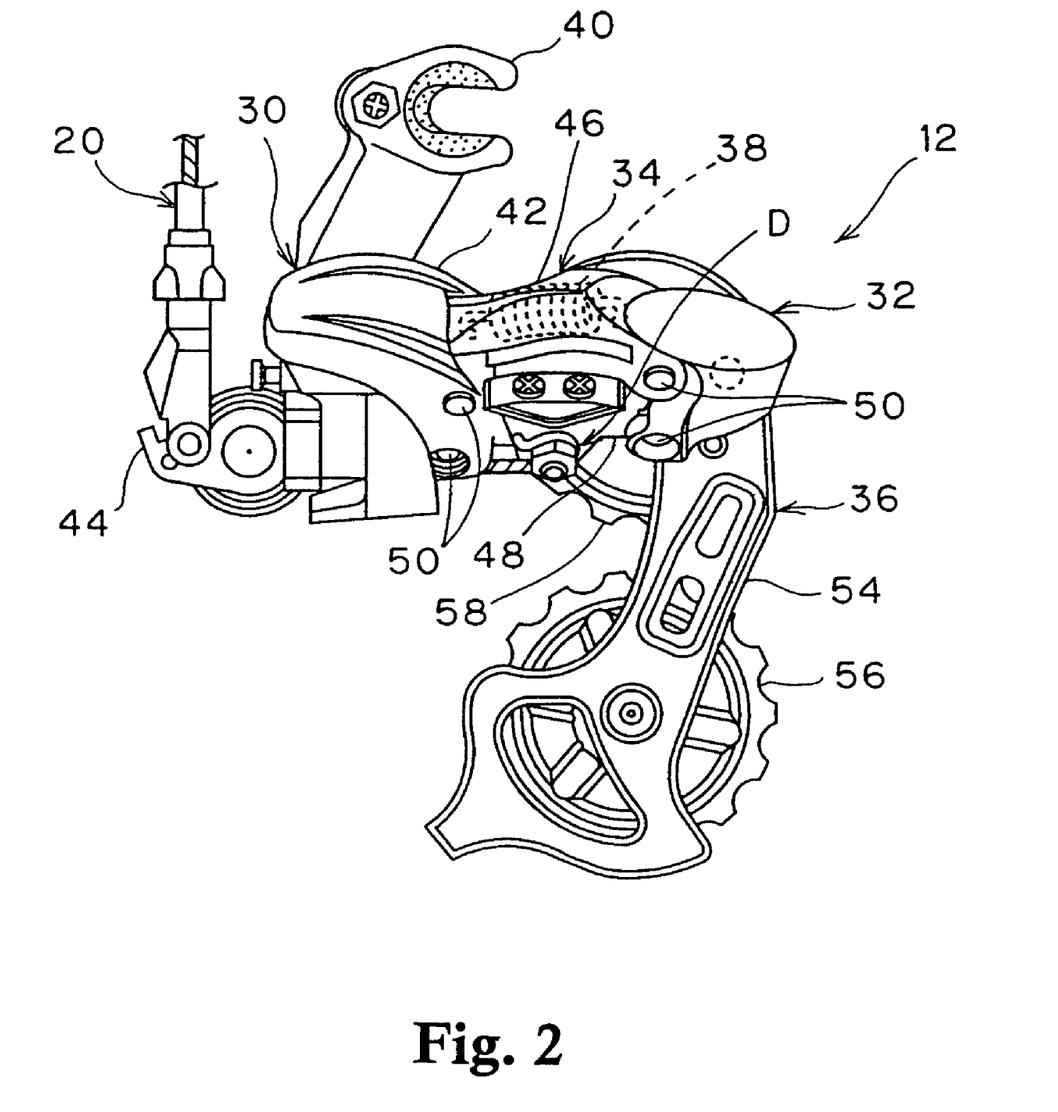
FIG. 2 is an enlarged, outside elevational view of the rear derailleur of the bicycle illustrated in FIG. 1.

Referring initially to FIGS. 1-2, a bicycle 10 with a rear bicycle derailleur 12 is illustrated in accordance with a preferred embodiment of the present invention. The bicycle 10 is preferably a conventional multi-speed bicycle that includes a frame 11 with front and rear wheels 14 and 16 coupled to the frame 11 in a conventional manner. The frame 11 includes a front fork pivotally coupled thereto with a handlebar coupled to the front fork in a conventional manner to steer the front wheel 14. The rear wheel 16 is coupled to the rear triangle of the frame 11. The rear derailleur 12 of the present invention is designed such that jamming can be reduced and/or prevented if the rear derailleur 12 is pushed into the rear wheel 16 by debris or the like, as explained below.

A rear shift control device 18 is mounted on the handlebar to control the rear derailleur 12 via a control cable 20 (i.e., a Bowden cable) in a relatively conventional manner to move a chain C laterally over a plurality of rear sprockets RS that are coupled to the rear wheel 16. The rear sprockets RS are coupled to the rear wheel 16 via a freewheel (not shown) to selectively rotate the rear wheel 16 via the chain C in a conventional manner. A front crank FC with a plurality of front sprockets FS coupled thereto is coupled to the frame 11 to drive the chain C, and thus, to propel the bicycle 10. Preferably a front derailleur 22 with a front shift control cable 24 coupled thereto is coupled to the frame 11 in order to shift the chain C laterally over the front sprockets FS in a conventional manner.

Preferably, front and rear brake mechanisms 26 and 28 are coupled to the frame 1 to selectively apply braking forces to the rims of the front and rear wheels 14 and 16, respectively, in a conventional manner. A front shift control mechanism (not shown) is also preferably coupled to the handlebar to control the front derailleur 22 to shift the chain C laterally over the front sprockets FS. The rear shift control device 18 preferably includes a brake lever pivotally coupled thereto to control the rear brake mechanism 28 in a conventional manner. The front shift control mechanism (not shown) also preferably includes a brake lever pivotally coupled thereto to control the front brake mechanism 26 in a conventional manner.

Since the various parts of the bicycle 10 are conventional, except for the rear derailleur 12, the remaining parts of the bicycle 10 will not be discussed and/or illustrated in detail herein, except as they relate to the rear derailleur 12. Moreover, it will be apparent to those skilled in the art from this disclosure that various modifications can be made to the various components or parts of the bicycle 10 without departing from the scope of the present invention.

Referring now to FIGS. 2-6, the rear derailleur 12 of the present invention will now be explained in more detail. The rear derailleur 12 of the present invention basically includes a base member 30, a movable member 32, a linkage assembly 34, a chain guide 36 and a main biasing member or spring 38. The parts of the chain guide 36 are configured and arranged to prevent/reduce jamming of the rear derailleur 12 and/or the rear wheel 16 if the chain guide 36 contacts spokes S of the rear wheel 16, as explained below in more detail. The base member 30 is fixedly coupled to the frame 11 of the bicycle 10 for limited rotational movement, while the movable member 32 is movably coupled to the base member 30 via the linkage assembly 34. The chain guide 36 is pivotally coupled to the movable member 32. The main biasing member or spring 38 normally biases the chain guide 36 to the outer most (smallest) of the rear sprockets RS.

The rear derailleur 12 is conventional, except for the chain guide 36 of the present invention. In particular, the rear derailleur 12 is basically identical to the rear derailleur (e.g., model RD-TX50) of the Tourney TX™ component group available from Shimano, Inc., except the rear derailleur 12 of the present invention is equipped with the chain guide 36 in accordance with the present invention rather than a conventional chain guide. Thus, the basic operation of rear derailleur 12 is well known in the prior art. Accordingly, the rear derailleur 12 will not be discussed and/or illustrated in detail herein, except as related to the present invention. Moreover, it will be apparent to those skilled in the art from this disclosure that various modifications can be made to the rear derailleur 12 without departing from the scope of the present invention.

As best seen in FIG. 2, the base member 30 is illustrated as being constructed of a frame fixing part 40 and a housing part 42. The frame fixing part 40 is fixedly coupled to the frame 11 in a conventional manner. The housing part 42 is pivotally coupled to the frame fixing part 40 in a conventional manner. The housing part 42 has a cable mounting portion 44 coupled thereto in a conventional manner. Of course, it will be apparent to those skilled in the art from this disclosure that the base member 30 could have other configurations as needed and/or desired. In any case, the base member 30 is preferably coupled to the frame 11 for limited rotational movement.

The linkage assembly 34 includes a pair of links 46 and 48 that are pivotally coupled at first ends to the base member 30 and pivotally coupled at their other ends to the movable member 32. Four pins 50 are used to pivotally couple the links 46 and 48 to the base member 30 and the movable member 32. The main biasing member 38 (i.e., a coil spring) is coupled between the links 46 and 48 for biasing the chain guide 36 in one direction, while the inner wire of the cable 20 moves links 46 and 48 to move the chain guide 36 in the other direction to locate the chain guide 36 in the correct gear position in a conventional manner. In the illustrated embodiment, the link 46 is an outer link, while the link 48 is an inner link. The outer link 46 preferably has a cable fixing device D for coupling the cable 20 thereto in a conventional manner. Of course, it will be apparent to those skilled in the art from this disclosure that various modifications can be made to the linkage assembly 34 without departing from the scope of the present invention.

The base member 30, the movable member 32 and the linkage assembly 34 form parts of a shiftable portion of the rear derailleur 12 that is configured and arranged to move between at least a top position and a low position. Specifically, the control cable 20 and the biasing member 38 cooperate in response to pulling/releasing the control cable 20 by the control device 18 to move the shiftable portion (i.e., the movable member 32 and the linkage assembly 34) between a top position and a low position, as best understood by the arrow in FIG. 3. Thus, the chain guide 36 is selectively moved laterally between at least a top position and a low position by the shiftable portion in a conventional manner.

Of course, it will be apparent to those skilled in the art from this disclosure that various modifications can be made to the parts of the so-called shiftable portion of the present invention without departing from the scope of the present invention. In other words, it will be apparent to those skilled in the art from this disclosure that the chain guide 36 of the present invention can be used in various derailleur designs without departing from the scope of the present invention.

Figure 3:
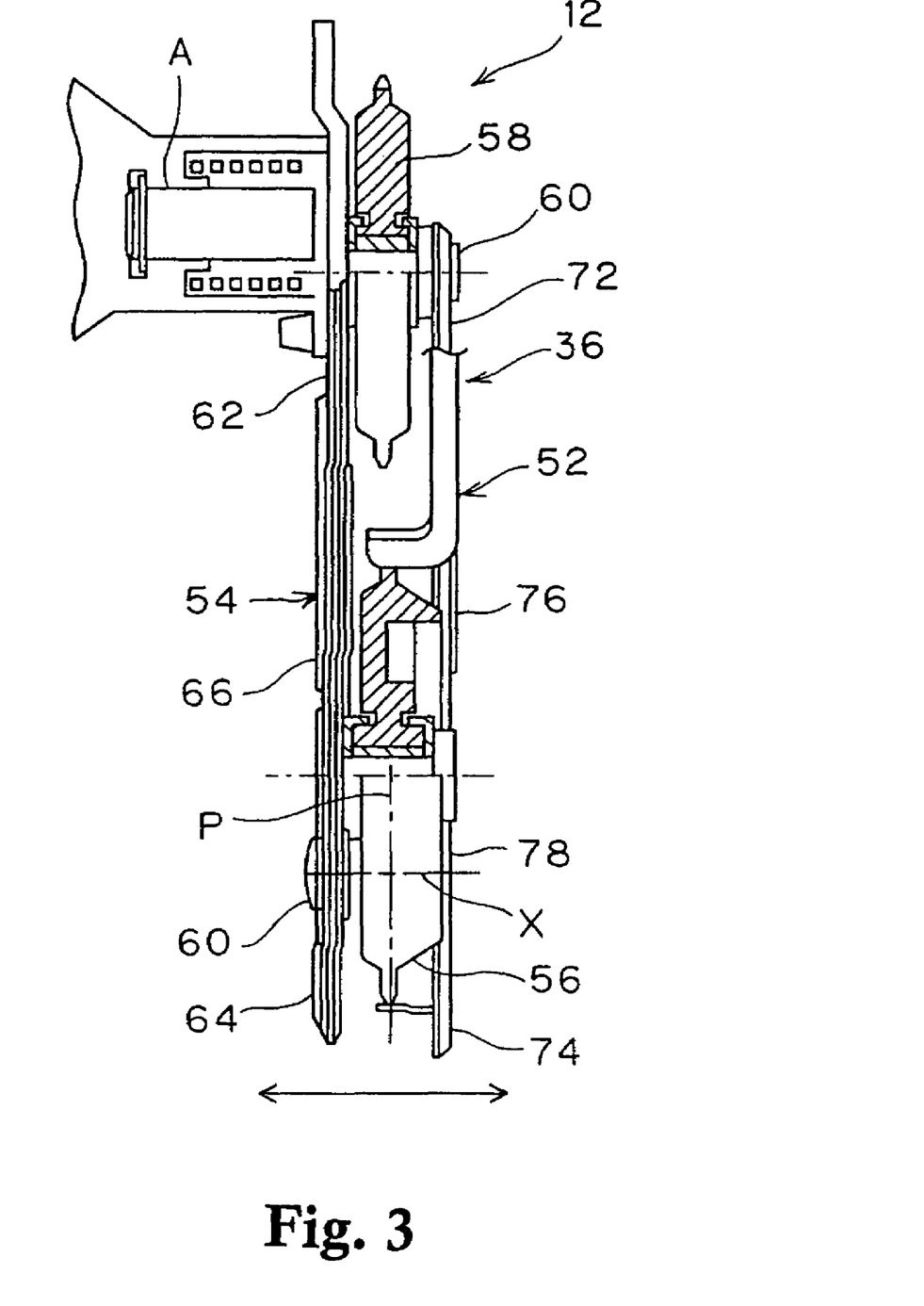
FIG. 3 is a further enlarged, partial front elevational view of the rear derailleur illustrated in FIGS. 1 and 2, with portions shown in cross-section for the purpose of illustration.
Figure 4:
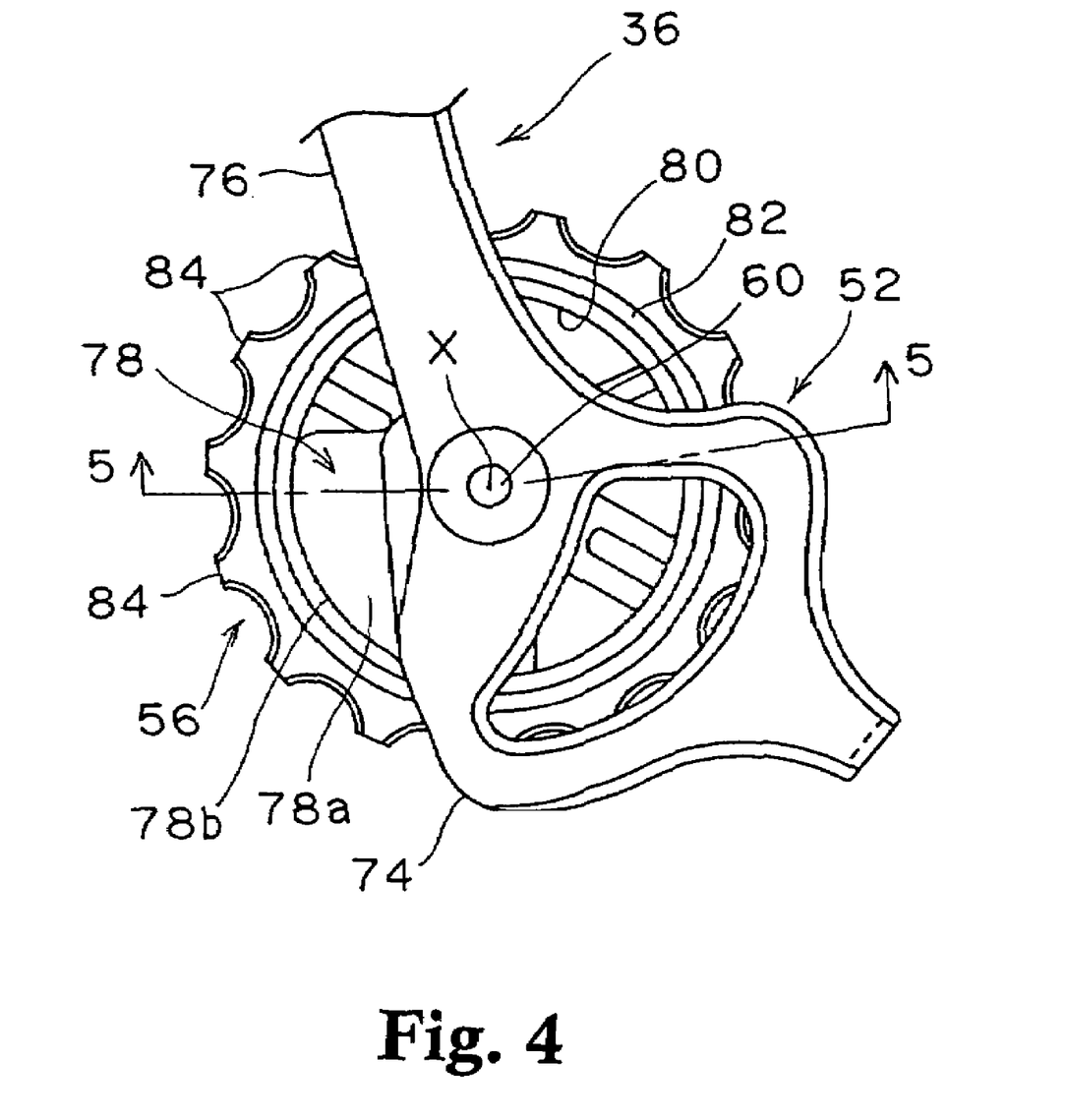
FIG. 4 is a partial, inside elevational view of the chain guide of the rear derailleur illustrated in FIG. 3.

Referring to FIGS. 2-14, the chain guide 36 of the present invention will now be discussed in more detail. The chain guide 36 is pivotally coupled to the movable member 32 for limited rotation relative thereto in a conventional manner, as seen in FIG. 3. The chain guide 36 basically includes and inner guide plate 52, an outer guide plate 54, a tension pulley or sprocket 56 and a guide pulley or sprocket 58. The pulleys 54 and 58 are rotatably coupled between the guide plates 52 and 54. The pulleys 56 and 58 engage chain C in a conventional S-type configuration. The inner and outer guide plates 52 and 54 are coupled together by a pair of fasteners 60. Preferably, the fasteners 60 are bolts that are partially threaded. The pulleys 56 and 58 are preferably rotatably mounted on the bolts 60 between the inner and outer guide plates 52 and 54. The outer guide plate 54 is coupled to the movable member 22 via an axle A in a conventional manner, as seen in FIG. 3.

The outer guide plate 54 basically includes an outer attachment end 62 and an outer free end 64 with an outer connecting portion 66 extending between the outer attachment end 62 and the outer free end 64. The outer attachment end 62 is coupled to the movable member 32 via the axle A in a conventional manner. One of the bolts 60 is mounted at the outer attachment end 62 (i.e., in an unthreaded bore, not shown), while the other bolt 60 is mounted at the outer free end 64 (i.e., in an unthreaded bore, not shown) to support the pulleys 58 and 56, respectively. The outer guide plate 54 is basically conventional. Thus, the outer guide plate 54 will not be discussed in further detail herein.

The inner guide plate 52 basically has an inner attachment end 72 and an inner free end 74 and an inner connecting portion 76 extending between the inner attachment end 72 and the inner free end 74. The inner attachment end 72 is located adjacent the outer attachment end 62, while the inner free end 74 is located adjacent the outer free end 64. The guide plates 52 and 54 are coupled in a laterally spaced arrangement so that the pulleys 56 and 58 can be coupled therebetween with the chain C cycled around the pulleys 56 and 58. Thus, the guide plates 52 and 54 form a chain receiving slot. Specifically, one of the bolts 60 is mounted at the inner attachment end 72 (i.e., in a threaded bore, not shown), while the other bolt 60 is mounted at the inner free end 64 (i.e., in a threaded bore) to support the pulleys 58 and 56, respectively.

The guide pulley 58 is mounted on the bolt 60 that is mounted between the attachment ends 62 and 72, while the tension pulley 56 is mounted on the other bolt 60 that is mounted between the free ends 64 and 74. Thus, the pulleys 56 and 58 are mounted between the guide plates 52 and 54. The guide pulley 58 is basically a conventional pulley. The guide pulley 58 preferably includes eleven teeth that engage the chain C. Thus, the guide pulley 58 will not be discussed in further detail herein. In other words, both the outer guide plate 54 and the guide pulley 58 are basically conventional, and will not be discussed and/or illustrated in detail herein. However, the inner guide plate 52 includes a guide section 78 that cooperates with the tension pulley 56 in accordance with the present invention to reduce and/or prevent jamming of the rear derailleur 12 and the rear wheel 16.

As best seen in FIGS. 4-6 and 11-14, the tension pulley 56 includes an annular recess 80 disposed about its rotation axis X to form a projection 82 that is located radially inwardly of a plurality of teeth 84. The projection 82 is located radially outwardly of the annular recess 80. In the illustrated embodiment, the projection 82 projects in an axial direction away from a center plane P of the tension pulley 56. Specifically, the projection 82 projects in an axial direction further from the center plane P than part of the guide section 78, as explained below.

The teeth 84 are conventional teeth designed to engage the chain C in a conventional manner. Preferably, the tension pulley 56 is relatively larger than the guide pulley 58. In particular, the tension pulley 56 preferably has more teeth 84 than the guide pulley 58. More specifically, the tension pulley 56 preferably has at least thirteen teeth 84. In the illustrated embodiment, the tension pulley 56 preferably has fifteen teeth 84.

Figure 5:
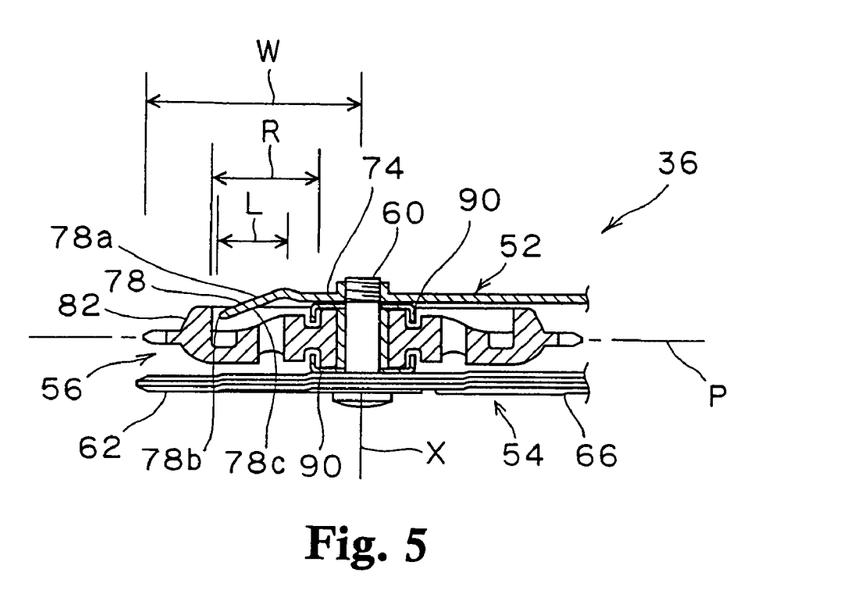
FIG. 5 is a partial, cross-sectional view of the chain guide of the rear derailleur illustrated in FIGS. 3 and 4, as seen along section line 5-5 of FIG. 4.
Figure 6:
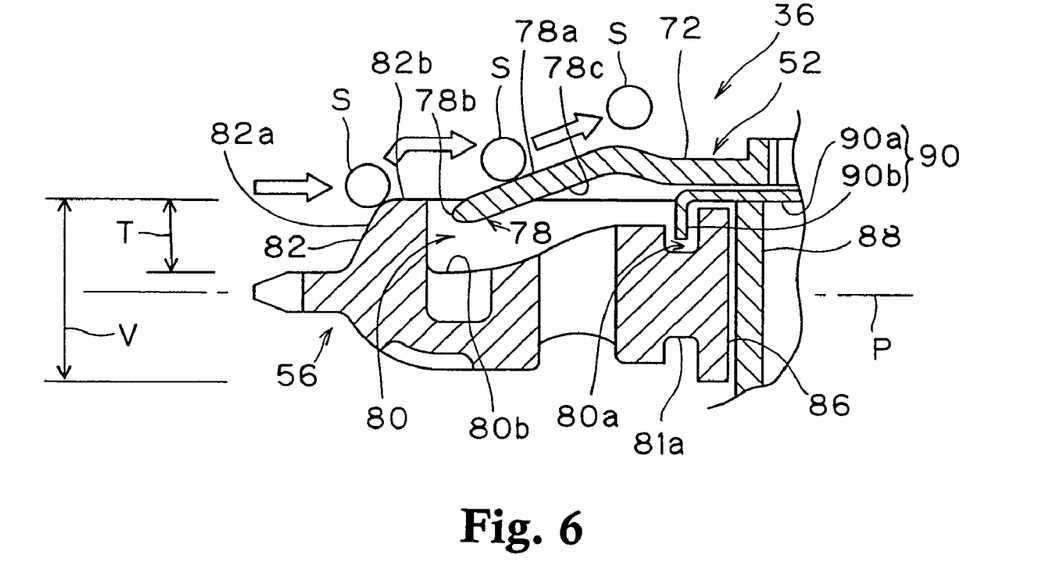
FIG. 6 is an enlarged cross-sectional view of part of the chain guide illustrated in FIG. 5, showing the contact with a spoke or spokes of the rear wheel for the purpose of illustration.
Figure 7:
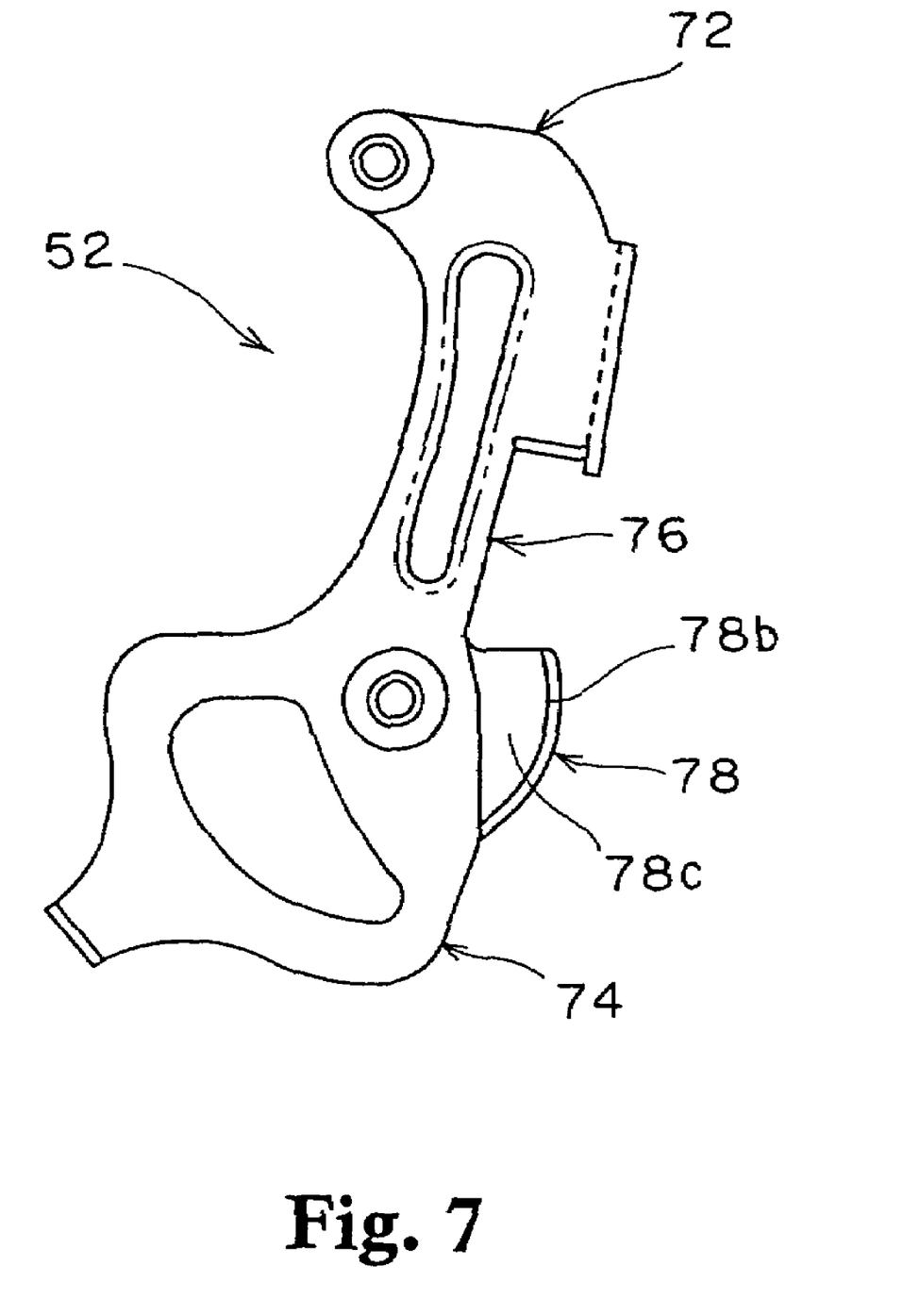
FIG. 7 is an outside elevational view of the inner guide plate of the chain guide illustrated in FIGS. 1-5.
Figure 8:
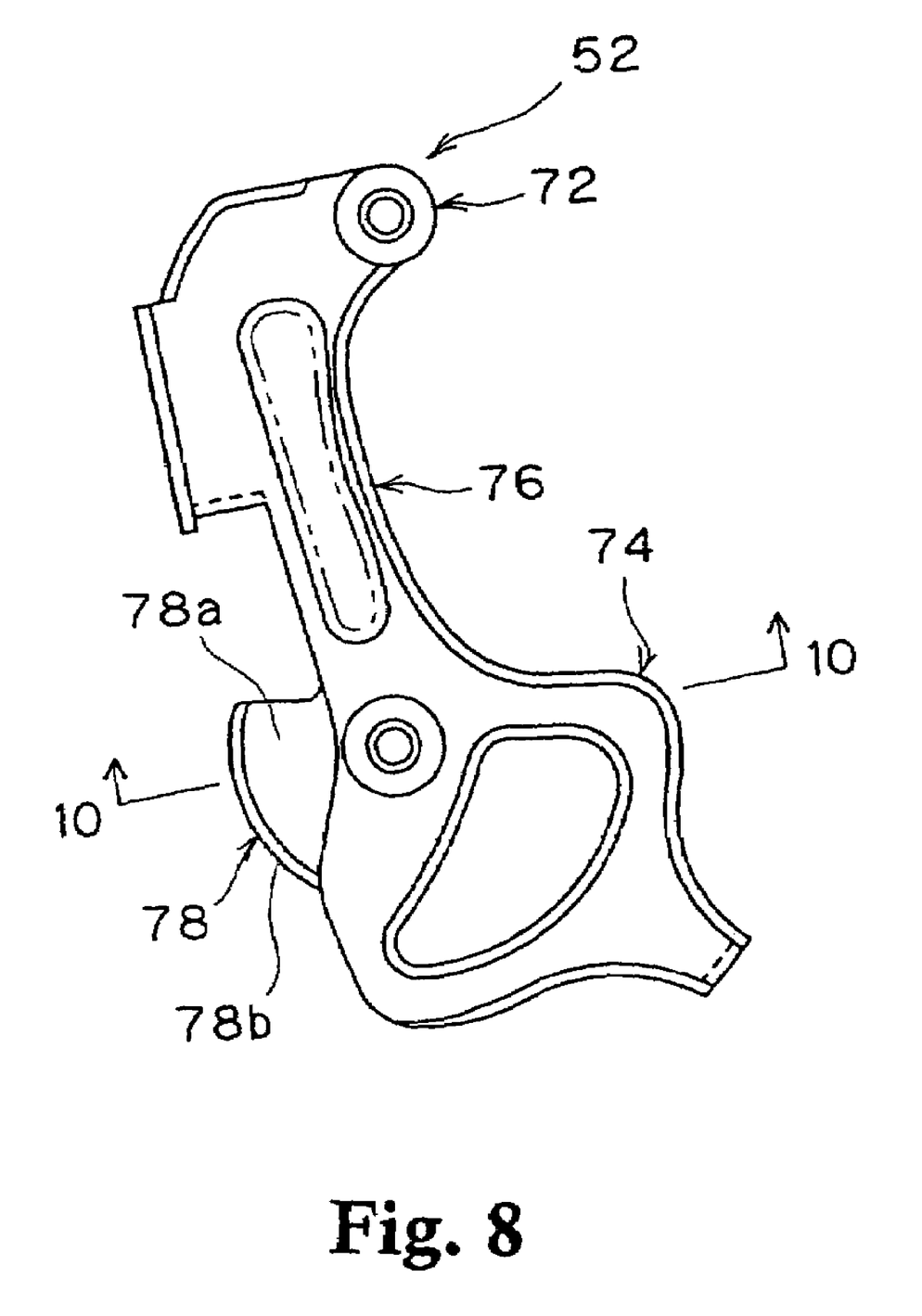
FIG. 8 is an inside elevational view of the inner guide plate of the chain guide illustrated in FIGS. 1-5 and 7.
Figure 9:
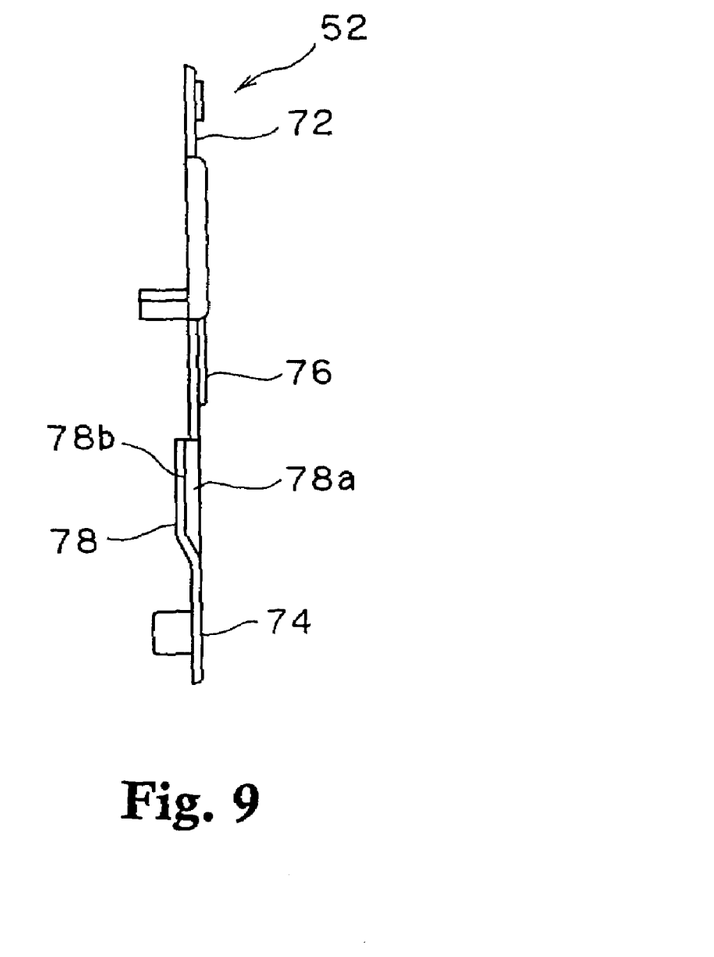
FIG. 9 is a front end elevational view of the inner guide plate illustrated in FIGS. 7 and 8.
Figure 10:
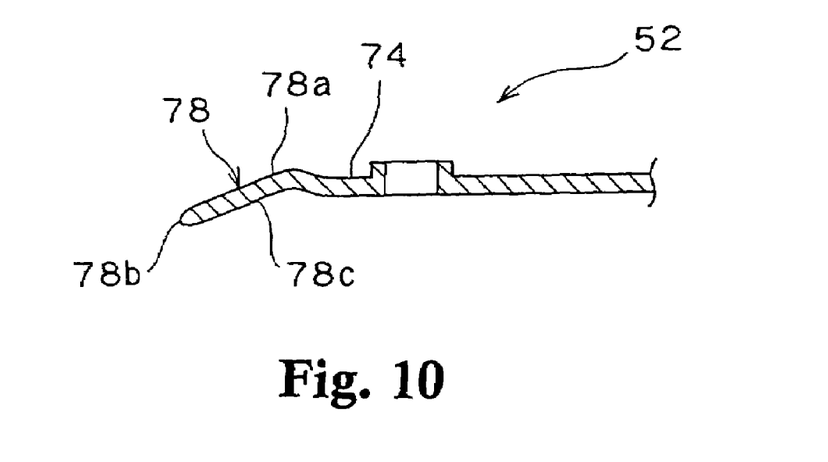
FIG. 10 is a cross-sectional view of the inner guide plate illustrated in FIGS. 7-9, as seen along section line 10-10 of FIG. 8.

As best seen in FIGS. 5 and 6, the annular recess 80 preferably has a maximum axial depth T and a maximum radial width R. The depth of the recess 80 varies between a minimum dept and the maximum depth T. The maximum depth T of the recess 80 is preferably at least about one third of a maximum overall axial dimension V of the tension pulley 56. In the illustrated embodiment, the maximum depth T of the recess 80 is preferably about 40-45% of the maximum overall axial dimension V of the tension pulley 56. The maximum radial width R of the recess 80 is preferably at least about one third of a maximum overall radial width W of the tension pulley 56. In the illustrated embodiment, the maximum radial width R of the recess 80 is preferably about one half of the maximum overall radial width W of the tension pulley 56.

Figure 11:
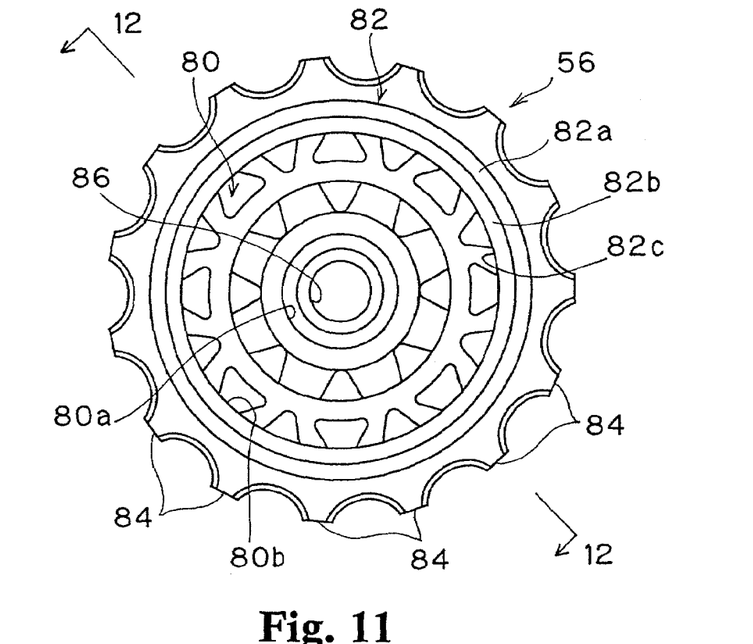
FIG. 11 is an enlarged, inside elevational view of the tension pulley of the chain guide illustrated in FIGS. 1-5.
Figure 12:
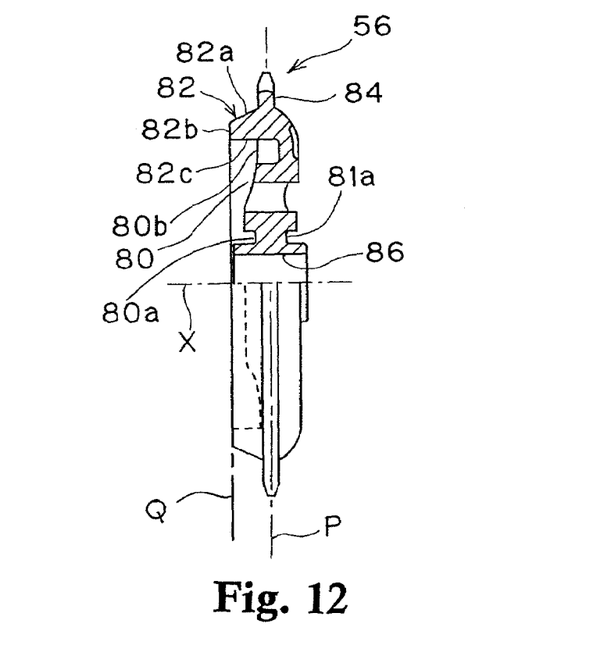
FIG. 12 is a partial cross-sectional view of the tension pulley illustrated in FIG. 11, as seen along section line 12-12 of FIG. 11.
Figure 13:
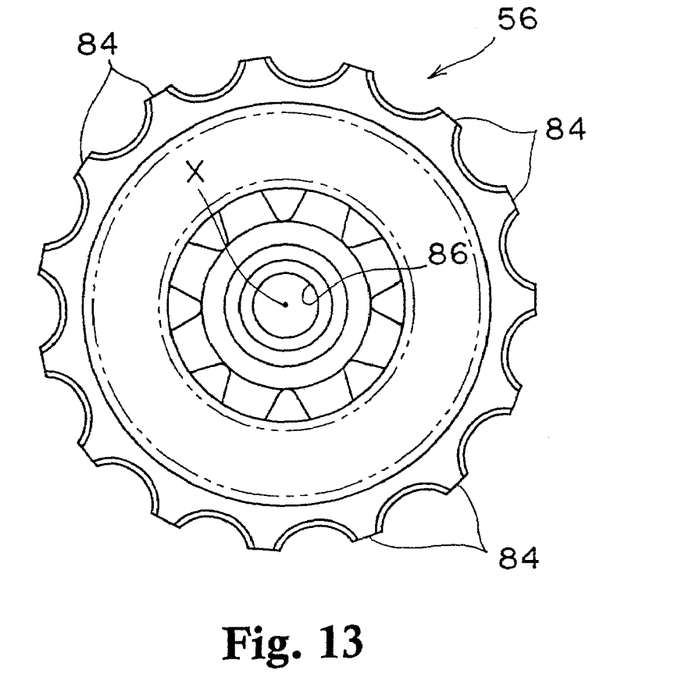
FIG. 13 is an outside elevational view of the tension pulley illustrated in FIGS. 11 and 12.

In this embodiment, the projection 82 preferably is an annular (continuous) projecting member that has a constant cross-sectional profile about the entire circumference of the tension pulley 56, as best seen in FIGS. 11 and 12. However, it will be apparent to those skilled in the art from this disclosure that the projection 82 could be formed of several circumferentially spaced separate projecting members, as discussed below with reference to another preferred embodiment of the present invention. Alternatively, the annular projection 82 could have a plurality of circumferentially spaced cutouts formed therein as needed and/or desired.

Figure 14:
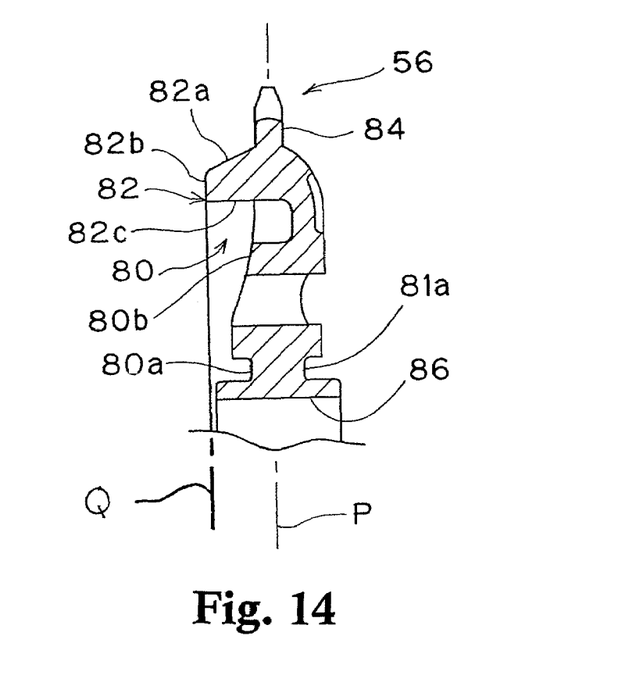
FIG. 14, is a further enlarged, partial cross-sectional view of the tension pulley illustrated in FIGS. 11-13, as seen along section line 12-12 of FIG. 11.

In any event, the projection 82 preferably has a sloped guide surface 82a, an inner facing surface 82b and an internal surface 82c. The sloped guide surface 82a diverges from the center plane P of the tension pulley 56 as the guide surface 82a approaches the rotation axis X. Preferably, the sloped guide surface 82a is a frustoconically shaped surface. The inner facing surface 82b extends radially inwardly from an axially innermost end of the sloped guide surface 82a. Preferably, the inner facing surface 82b is an annular, planar surface. The inner facing surface 82b forms a free edge of the projection 82 located furthest from the center plane P of the tension pulley 56. The inner facing surface (free edge) 82b of the projection 82 lies in an offset plane Q perpendicular to the rotation axis X, and parallel to the center plane P of the tension pulley 56, as best seen in FIGS. 12 and 14. Preferably, the sloped guide surface 82a and the inner facing surface 82b are substantially flat. The internal surface 82c is preferably a cylindrical flat surface that extends axially toward a center plane P of the tension pulley 56 from the inner facing surface 82b.

The tension pulley 56 preferably further includes a through opening 86 with a bushing 88 mounted therein. One of the bolts 60 is received within the bushing 88 such that the tension pulley 56 is freely rotatable. A plurality of holes/cutouts are also preferably formed in the tension pulley 56. A dust cap 90 is preferably mounted on each axial side of the tension pulley 56. Each dust cap 90 is preferably an annular, cup-shaped member that has a mounting portion 90a and an an annular flange portion 90b. Each dust cap 90 is also mounted about the bolt 60 and the rotation axis X. In particular, each dust cap 90 has an open end defined by the annular (cylindrical) portion 90b that faces the center plane P. The dust caps 90 are mounted axially between the tension pulley 56 and the inner and outer guide plates 52 and 54.

The annular flange 90b of one dust cap 90 is received within an annular recessed area 80a of the annular recess 80, while the annular flange 90b of the other dust cap 90 is received within an annular recessed area 81 a substantially identical to the recessed area 80a. The annular recessed area 80a defines a radially inner most periphery of the recess 80. The annular recessed area 80a is located radially inwardly of an outer recessed area 80b of the recess 80. The guide section 78 of the inner guide plate 52 is preferably at least partially received in the outer recessed area 80b of the annular recess 80, as explained below in more detail. Thus, the guide section 78 is preferably located radially outwardly of the annular flanges 90b of the dust caps 90.

Referring to FIGS. 2-10, the guide section 78 of the inner guide plate 52 will now be discussed in more detail. The guide section 78 is a sloped (i.e. relative to the center plane P and the rotation axis X) plate-shaped element that includes a sloped guide surface 78a, an outermost edge or end surface 78b and a sloped interior surface 78c that is preferably substantially parallel to the sloped guide surface 78a. The sloped interior surface 78c is connected to the sloped guide surface 78a at the outermost end surface 78b of the guide section 78. Both the sloped guide surface 78a and the sloped interior surface 78c are preferably substantially flat, substantially frustoconically shaped surfaces.

The guide section 78 of the inner guide plate 52 has a maximum radial length L that is preferably at least about one fourth of the maximum overall radial width W of the tension pulley 56. In the illustrated embodiment, the maximum radial length L that is preferably about one third of the maximum overall radial width W of the tension pulley 56. Thus, the maximum radial width R of the recess 80 is preferably larger than the maximum radial length L of the guide section 78 of the inner guide plate 52.

The radially outermost edge 78b of the guide section 78 is located in the annular recess 80. Thus, the projection 82 projects in the axial direction further from the center plane P of the tension pulley 56 than the outermost edge 78b of the guide section 78. Accordingly, the outermost edge 78b of the guide section 78 is located radially inwardly of the projection 82. Furthermore, the outermost edge 78b of the guide section 78 is located radially outwardly of the annular portion 90b of the dust cap 90 that is mounted adjacent thereto.

The sloped guide surface 78a extends from the outermost edge 78b of the guide section 78 toward the rotation axis X, the sloped guide surface 78a diverging from the center plane P of the tension pulley 56 as the sloped guide surface 78a approaches the rotation axis X. Additionally, the sloped guide surface 78a preferably extends at least partially into the annular recess 80 of the tension pulley 56 at the outermost edge 78b of the guide section 78. Thus, the outer most edge 78b and part of the sloped guide surface 78a are preferably located closer to the center plane P of the tension pulley 56 than the inner facing surface 82b of the projection 82.

Due to the configurations of the guide section 78 and the tension pulley 56, if the chain guide 36 is pushed into the rear wheel 16 by an obstruction, debris or the like, the spokes S will contact the guide surface 82a of the projection 82 and/or the sloped guide surface 78a of the guide section 78 to prevent/reduce jamming of the rear-derailleur 12 and/or the rear wheel 16. Specifically, if the derailleur 12 is contacted by an obstruction, debris or the like, the inner guide plate 52 and the tension pulley 56 of the chain guide 36 could be pushed toward the wheel 16 (i.e., toward the right in FIG. 3) to the point where they contact the spokes S, as seen in FIG. 6.

SECOND EMBODIMENT

Figure 15:
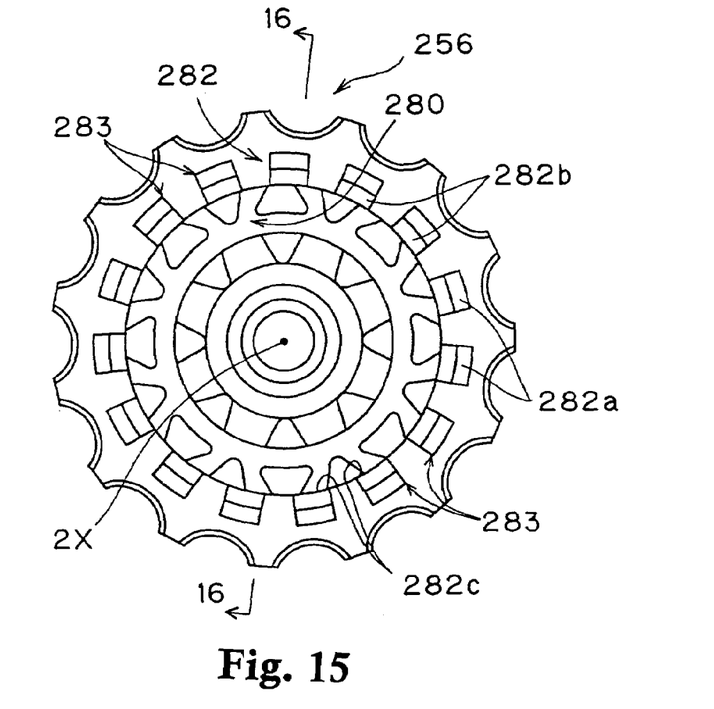
FIG. 15 is an enlarged, inside elevational view of a tension pulley in accordance with a second preferred embodiment of the present invention.
Figure 16:
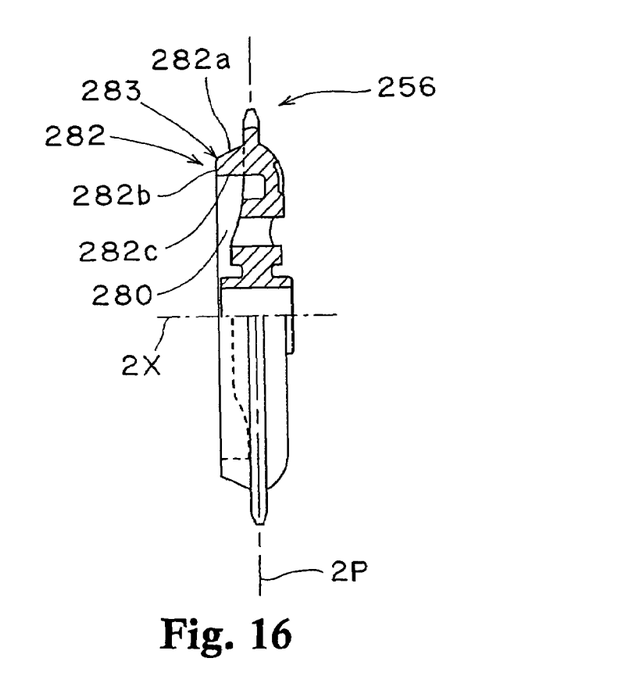
FIG. 16 is a partial cross-sectional view of the tension pulley illustrated in FIG. 15, as seen along section line 16-16 of FIG. 15.

Referring now to FIGS. 15 and 16, a modified tension pulley 256 is illustrated in accordance with a second embodiment of the present invention. The tension pulley 256 is designed to be used in the chain guide 36 of the first embodiment in place of the tension pulley 56 of the first embodiment. The tension pulley 256 of this second embodiment is identical to the tension pulley 56 of the first embodiment, except the tension pulley 256 includes a recess 280 disposed about a rotation axis 2X to form a modified projection 282 in place of the projection 82 of the first embodiment. Thus, the tension pulley 256 will not be discussed and/or illustrated in detail herein. Rather, it will be apparent to those skilled in the art from this disclosure that the descriptions and illustrations of the tension pulley 56 of the first embodiment also apply to the tension pulley 256 of this second embodiment, except as explained and illustrated herein.

The recess 280 is identical to the recess 80 of the first embodiment, except the recess 280 has a segment outer recessed are due to the configuration of the modified projection 282, as explained below. The projection 282 is similar to the projection 82 of the first embodiment. Specifically, the projection 282 has the same cross-sectional profile as the projection 82 of the first embodiment. However, the projection 282 includes a plurality of projecting members 283 that are circumferentially spaced about the rotation axis 2X. Accordingly, each projecting member 283 preferably has a sloped guide surface 282a, an inner facing surface 282b and an internal surface 282c.

The sloped guide surfaces 282a diverge from the center plane 2P of the tension pulley 256 as the guide surfaces 282a approach the rotation axis 2X. Preferably, the sloped guide surfaces 282a are frustoconically shaped surfaces. The inner facing surfaces 282b extend radially inwardly from axially innermost ends of the sloped guide surfaces 282a. Preferably, the inner facing surfaces 282b planar surfaces. Preferably, the sloped guide surfaces 282a and the inner facing surfaces 282b are substantially flat. The internal surfaces 282c are preferably cylindrical flat surfaces that extend axially toward the center plane 2P of the tension pulley 256 from the inner facing surfaces 282b. In other words, the projecting members 283 together form a segmented annular shape.

Of course, it will be apparent to those skilled in the art from this disclosure that the inner facing surfaces 282b and the internal surface 282c could be connected to each other (i.e., to form a continuous tubular part) such that an annular projection with a plurality of circumferentially spaced cutouts formed therein is formed as needed and/or desired. In such an arrangement, the sloped guide surfaces would be segmented like this second embodiment, while the inner facing surface and the internal surface would be continuous like the first embodiment.

As used herein, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle derailleur comprising:
   a shiftable portion configured and arranged to move between a top position and a low position; and
   a chain guide coupled to said shiftable portion to be laterally moved by said shiftable portion, said chain guide including
      an inner guide plate having an inner attachment end and an inner free end,
      an outer guide plate having an outer attachment end and an outer free end that are arranged to form a chain receiving slot between said inner and outer guide plates,
      a guide pulley rotatably coupled between said inner and outer attachment ends of said inner and outer guide plates, and
      a tension pulley rotatably coupled about a rotation axis between said inner and outer free ends of said inner and outer guide plates, said tension pulley having an annular recess disposed about said rotation axis of said tension pulley to form a projection disposed further from said rotation axis than said recess and a center plane perpendicular to said axis of rotation, said projection having a free edge located furthest from said center plane, the free edge lying in an offset plane parallel to the center plane,
      said inner guide plate having a guide section with a sloped guide surface that intersects the offset plane and a radially outermost edge located in said annular recess, said projection projecting in an axial direction further from said center plane of said tension pulley than said outermost edge of said guide section.

2. The bicycle derailleur according to claim 1, wherein said sloped guide surface extends from said outermost edge of said guide section toward said rotation axis and diverges from said center plane of said tension pulley as said sloped guide surface approaches said rotation axis.

3. The bicycle derailleur according to claim 2, wherein said guide surface is substantially flat.

4. The bicycle derailleur according to claim 2, wherein said guide section includes a sloped interior surface substantially parallel to said sloped guide surface, said sloped interior surface being connected to said sloped guide surface at said outermost edge of said guide section.

5. The bicycle derailleur according to claim 2, wherein said sloped guide surface extends into said annular recess of said tension pulley at said outermost edge of said guide section.

6. The bicycle derailleur according to claim 1, wherein said projection includes a sloped guide surface that diverges from said center plane of said tension pulley as said guide surface of said projection approaches said rotation axis.

7. The bicycle derailleur according to claim 6, wherein said projection includes an inner facing surface that extends radially inwardly from an axially innermost end of said sloped guide surface of said projection.

8. The bicycle derailleur according to claim 7, wherein said sloped guide surface of said projection and said inner facing surface are substantially flat.

9. The bicycle derailleur according to claim 7, wherein said projection includes an internal surface that extends axially toward said center plane of said tension pulley from said inner facing surface.

10. The bicycle derailleur according to claim 1, wherein said guide section of said inner guide plate has a radial length that is at least about 25% of an overall radial width of said tension pulley.

11. The bicycle derailleur according to claim 10, wherein said annular recess has a radial length larger than the radial length of said guide section of said inner guide plate.

12. The bicycle derailleur according to claim 1, wherein said projection of said tension pulley includes a plurality of separate projecting members that are circumferentially disposed about said rotation axis.

13. The bicycle derailleur according to claim 1, wherein said projection of said tension pulley includes an annular projecting member extending about said rotation axis.

14. The A bicycle derailleur comprising:
a shiftable portion configured and arranged to move between a top position and a low position; and
a chain guide coupled to said shiftable portion to be laterally moved by said shiftable portion, said chain guide including
  an inner guide plate having an inner attachment end and an inner free end,
  an outer guide plate having an outer attachment end and an outer free end that are arranged to form a chain receiving slot between said inner and outer guide plates,
  a guide pulley rotatably coupled between said inner and outer attachment ends of said inner and outer guide plates,
  a tension pulley rotatably coupled about a rotation axis between said inner and outer free ends of said inner and outer guide plates, said tension pulley having an annular recess disposed about said rotation axis of said tension pulley to form a projection, and
  an annular, cup-shaped dust cap mounted axially between said inner guide plate and said tension pulley about said rotation axis,
  said inner guide plate having a guide section with a radially outermost edge of said guide section located in said annular recess, said projection projecting in an axial direction further from a center plane of said tension pulley than said outermost edge of said guide section.

15. The bicycle derailleur according to claim 14, wherein said dust cap includes a mounting portion and an annular portion extending from said mounting portion, said annular portion of said dust cap being located in said annular recess of said tension pulley and located radially inwardly of said guide section of said inner guide plate.

16. A bicycle derailleur comprising:
a shiftable portion configured and arranged to move between a top position and a low position; and
a chain guide coupled to said shiftable portion to be laterally moved by said shiftable portion, said chain guide including
  an inner guide plate having an inner attachment end and an inner free end,
  an outer guide plate having an outer attachment end and an outer free end that are arranged to form a chain receiving slot between said inner and outer guide plates,
  a guide pulley rotatably coupled between said inner and outer attachment ends of said inner and outer guide plates,
  a tension pulley rotatably coupled about a rotation axis between said inner and outer free ends of said inner and outer guide plates, said tension pulley having an annular recess disposed about said rotation axis of said tension pulley to form a projection projecting in an axial direction from a center plane of said tension pulley, and
  a dust cap coupled between said inner guide plate and said tension pulley, said dust cap having a mounting portion and an annular portion extending from said mounting portion into said recess about said rotation axis,
  said inner guide plate having a guide section with a radially outermost edge of said guide section located radially inwardly of said projection and radially outwardly of said annular portion of said dust cap.

17. The bicycle derailleur according to claim 16, wherein said guide section includes a sloped guide surface that extends from said outermost edge of said guide section toward said rotation axis, said sloped guide surface diverging from said center plane of said tension pulley as said guide surface approaches said rotation axis.

18. The bicycle derailleur according to claim 17, wherein said guide surface is substantially flat.

19. The bicycle derailleur according to claim 17, wherein said guide section includes a sloped interior surface substantially parallel to said sloped guide surface, said sloped interior surface being connected to said sloped guide surface at said outermost edge of said guide section.

20. The bicycle derailleur according to claim 17, wherein said sloped guide surface extends into said annular recess of said tension pulley at said outermost edge of said guide section.

21. The bicycle derailleur according to claim 16, wherein said projection includes a sloped guide surface that diverges from said center plane of said tension pulley as said guide surface approaches said rotation axis.

22. The bicycle derailleur according to claim 21, wherein said projection includes an inner facing surface that extends radially inwardly from an axially innermost end of said sloped guide surface.

23. The bicycle derailleur according to claim 22, wherein said sloped guide surface and said inner facing surface are substantially flat.

24. The bicycle derailleur according to claim 22, wherein said projection includes an internal surface that extends axially toward said center plane of said tension pulley from said inner facing surface.

25. The bicycle derailleur according to claim 16, wherein said guide section of said inner guide plate has a radial length that is at least about 25% of an overall radial width of said tension pulley.

26. The bicycle derailleur according to claim 25, wherein said annular recess has a radial length larger than the radial length of said guide section of said inner guide plate.

27. The bicycle derailleur according to claim 16, wherein said projection of said tension pulley includes a plurality of separate projecting members that are circumferentially disposed about said rotation axis.

28. The bicycle derailleur according to claim 16, wherein said projection of said tension pulley includes an annular projecting member extending about said rotation axis.

* * * * *